United States Patent [19]

Goto et al.

[11] Patent Number: 5,050,349
[45] Date of Patent: Sep. 24, 1991

[54] WEATHER STRIP FOR MOTOR VEHICLE

[75] Inventors: Yoshinori Goto, Kakamihara; Masahiro Nozaki, Ama, both of Japan

[73] Assignee: Toyoda Gosei Co., Ltd., Nishikasugai, Japan

[21] Appl. No.: 578,290

[22] Filed: Sep. 6, 1990

[30] Foreign Application Priority Data

Sep. 18, 1989 [JP] Japan ............... 1-108819[U]

[51] Int. Cl.$^5$ ................................................ E06B 7/16
[52] U.S. Cl. ........................................ 49/488; 49/489; 49/441
[58] Field of Search ............... 49/440, 441, 409, 491, 49/488, 498

[56] References Cited

U.S. PATENT DOCUMENTS

| | | | |
|---|---|---|---|
| 2,737,412 | 3/1956 | Smith et al. | 49/498 X |
| 3,124,851 | 3/1964 | Straight et al. | 49/491 |
| 4,047,751 | 9/1977 | Koike | 49/498 X |
| 4,455,785 | 6/1984 | Wahr et al. | 49/488 |
| 4,656,784 | 4/1987 | Brachmann | 49/441 X |
| 4,667,442 | 5/1987 | Hiramatsu et al. | 49/441 |
| 4,694,611 | 9/1987 | Okumura | 49/488 X |
| 4,819,381 | 4/1989 | Kitaura et al. | 49/489 X |
| 4,934,101 | 6/1990 | Hannya et al. | 49/441 X |

FOREIGN PATENT DOCUMENTS

| | | | |
|---|---|---|---|
| 1033883 | 7/1958 | Fed. Rep. of Germany | 49/489 |
| 59-157915 | 10/1984 | Japan . | |
| 62-25369 | 6/1987 | Japan . | |
| 63-196717 | 12/1988 | Japan . | |
| 0305020 | 12/1988 | Japan | 49/488 |

Primary Examiner—Rodney M. Lindsey
Assistant Examiner—Jerry Redman
Attorney, Agent, or Firm—Cushman, Darby & Cushman

[57] ABSTRACT

A weather strip is provided having a base portion which is to be attached along a door opening, a tubular sealing portion composed of a seal wall which is pushed up by a peripheral edge of a door glass and side walls for connecting inner and outer ends of the seal wall to the base portion. A linear insert composed of a solid material such as solid rubber or synthetic resin is embedded in the corner defined by the connection of the seal wall to the outer side wall. When the seal wall is pushed by the peripheral edge of the door glass, deformation of the outer side wall provides excellent sealing properties. Furthermore, the insert of the invention limits outward movement of the door glass in response to pressures encountered when the motor vehicle is driven at high speed.

5 Claims, 3 Drawing Sheets

WEATHER STRIP FOR MOTOR VEHICLE

BACKGROUND OF THE INVENTION

1. Field of the Invention

The present invention relates to a weather strip for a motor vehicle and, more particularly, to a weather strip to be attached along a door opening for sealing a gap between the door opening and the door glass.

2. Description of the Prior Art

In motor vehicles having sashless doors, such as hardtop cars, a weather strip is attached along the upper half portion of the door opening of the vehicle body. A peripheral edge of the door glass comes into pressure contact with this weather strip. A tubular weather strip composed of a soft material such as sponge rubber is used for the above-described type of the weather strip. This tubular weather strip is fitted in a retainer which is attached along the door opening. When the door glass is elevated to its fully closed position, the weather strip is pushed by the peripheral edge of the door glass thereby sealing any gap between the door opening and the door glass.

When such a motor vehicle is driven at high speed, the door glass, particularly the upper portion thereof, is drawn outwardly due to a negative pressure generated in the vicinity of the upper portion of the side surface of the vehicle body. Accordingly, the sealing force of the weather strip against the door glass will be reduced.

In order to overcome the above-described problem, several weather strip designs have been developed.

FIG. 5 illustrates one such design. In FIG. 5, arrow A indicates the direction in which the door glass 3 is drawn outwardly, and arrow B indicates the direction in which the door glass 3 is opened and closed with the door. A lower end of a drip molding 5 extends downwardly to a position at which the drip molding 5 does not come into contact with the upper end of the door glass 3 when the door is opened and closed, but comes into contact therewith when the door is drawn outwardly (Japanese unexamined Utility Model publication No. Sho 63-196717). In the drawing, reference numeral 1A designates a weather strip, reference numeral 11 designates a base portion, reference numeral 12 designates a seal wall, reference numeral 16 designates an inner seal lip and reference numeral 4 designates a retainer.

In another prior art design, as shown in FIG. 6, the outside surface of a side wall 13, and a corner portion 15 between the side wall 13 and a seal wall 12 of a weather strip 1B are composed of a solid material such as solid rubber (Japanese examined Utility Model publication No. Sho 62-25369).

The mounted positions of doors and door glasses can vary. In the prior art design shown in FIG. 5, when the fully closed position of the door glass 3 is offset upwards, the upper end of the door glass 3 comes into contact with an extended end of the drip molding 5 every time the door is opened and closed. On the other hand, when the fully closed position of the door glass 3 is offset downwardly, the drip molding 5 does not prevent the door glass 3 from being drawn outwardly while the motor vehicle is driven at high speed.

In the prior art design shown in FIG. 6, when the seal wall 12 is pushed up by the door glass 3, the side wall 13 which is composed of the solid material will not deform and the corner portion 15 will not move in the direction of the door glass 3. Accordingly, the end portion of the door glass 3 will not be sufficiently embraced by the seal wall 12, thereby reducing the sealing force of the weather strip. When the mounted position of the door glass 3 deviates outwardly in the direction of the arrow C, the upper end of the door glass 3 will come into contact with the hard corner portion 15, thereby reducing the sealing force of the weather strip.

In the prior art design shown in FIG. 7, a through hole 6 is formed in the corner portion 15 of the weather strip 1C along the entire length thereof. A tube 8 is inserted into the through hole 6 and a wire 7 is inserted into the tube 8 so as to be slidable with respect to the tube 8. When the weather strip 1C is attached to the door opening, one end of the wire 7 is fixed to the vehicle body while the other end thereof is connected to an actuator (not shown) attached to the vehicle body for pulling the wire 7 when the vehicle speed reaches a speed at which the door is drawn outwardly. Accordingly, while the motor vehicle is driven at a high speed, the peripheral edge of the door glass 3 is pushed inwardly by the wire 7 through the corner portion 15, thereby preventing the door glass 3 from being drawn outwardly (Japanese unexamined Utility Model publication (Jikkai) No. Sho 59-157915).

However, that prior art design requires the difficulties of inserting the tube 8 and the wire 7 into the through hole 6. In addition, the actuator must be installed in the vehicle body.

SUMMARY OF THE INVENTION

It is an object of the present invention to provide a weather strip having excellent sealing properties and which prevents the door glass from being drawn outwardly.

It is another object of the present invention to provide a weather strip which can be produced at low cost and can prevent the door glass from being drawn outwardly without requiring an attachment such as an actuator.

The weather strip of the present invention is composed of soft elastic material such as sponge rubber. The weather strip has a base portion to be attached along a door opening, a tubular sealing portion composed of a seal wall which is pushed up by a peripheral edge of the door glass, and side walls for connecting inner and outer ends of the seal wall to the base portion. A linear insert composed of a solid material such as solid rubber or synthetic resin is embedded in the corner portion which connects the seal wall to the outer side wall, so as to be serial in a longitudinal direction of the weather strip.

In accordance with the present invention, when the seal wall is pushed up by the peripheral edge of the door glass, the outer side wall easily deforms. Accordingly, the peripheral edge of the door glass is embraced by the corner portion in which the insert is embedded, thereby achieving excellent sealing.

When an upper portion of the door glass tends to be drawn outwardly while the motor vehicle is driven at high speed, the corner portion which extends along the roof of the vehicle body is pushed out obliquely upwardly by the door glass. This causes the generation of tension in the insert so that a reaction force to the movement of the door glass increases to prevent the door glass from being drawn further outwardly.

DETAILED DESCRIPTION OF THE PRESENTLY PREFERRED EXEMPLARY EMBODIMENTS

Figure 1:
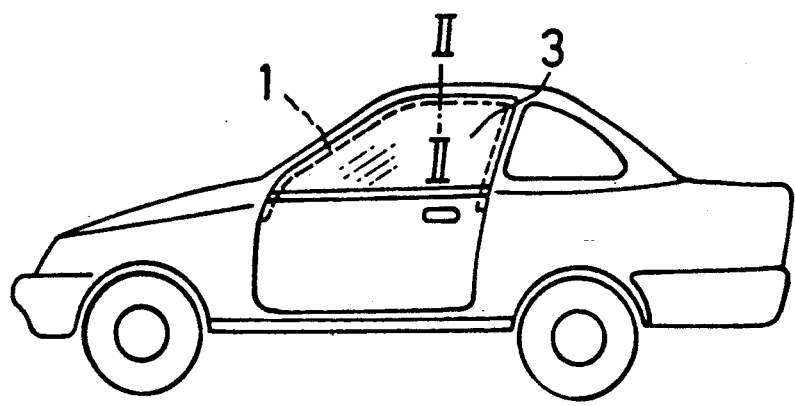
FIG. 1 is a side view of a motor vehicle to which a weather strip in accordance with the present invention is attached.
Figure 2:
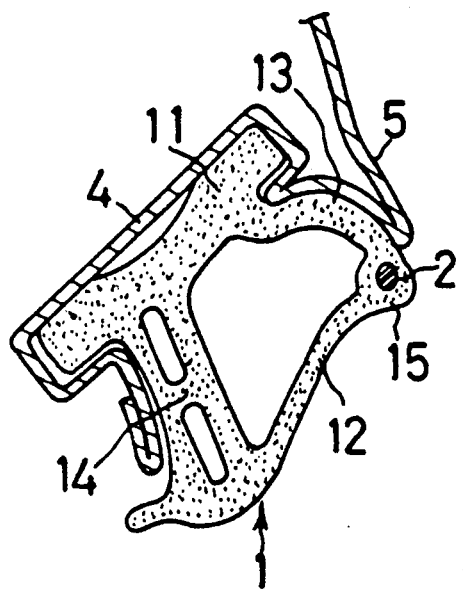
FIG. 2 is a cross-sectional view of an embodiment of a weather strip taken along the line II—II of FIG. 1, which is not pushed by a door glass.
Figure 3:
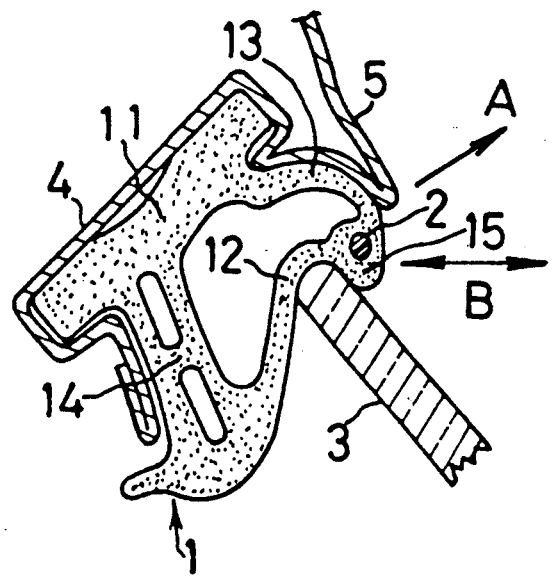
FIG. 3 is a cross-sectional view of the weather strip similar to FIG. 2 but pushed by the door glass.

In the embodiment shown in FIGS. 1 through 3, a weather strip 1 is attached to an upper half portion of a door opening of a hardtop car, which is opposed to a peripheral edge of a door glass 3.

The weather strip 1 is an extruded body composed of sponge rubber, having a base portion 11 to be fitted in a retainer 4 attached along the door opening, a tubular sealing portion composed of a seal wall 12 which is opposed to the base portion 11 through a space in front thereof, and side walls 13, 14, which connect inner and outer ends of the seal wall 12 to the base portion 11.

A linear insert 2 composed of solid rubber is embedded in a corner portion 15 which connects the seal wall 12 to the outer side wall 13, so as to be serial in the longitudinal direction of the weather strip.

The seal wall 12 has a thickness which allows the seal wall 12 to freely deform when the door glass 3 pushes the seal wall 12. The corner portion 15 has a thickness greater than that of the seal wall 12. The insert 2 is embedded in a central portion of the corner portion 15.

The weather strip 1 is composed of sponge rubber of EPDM, for example. The insert 2 is composed of a solid and flexible material such as solid rubber of EPDM, PVC resin, or polyamide resin.

The weather strip of the present invention can be easily produced by integrally extruding the material for the insert and the material for the weather strip.

When the weather strip 1 (FIG. 2) is fitted to the retainer 4, a lower end of the corner portion 15 is located so as to be free from contact with an upper end edge of the door glass 3 when the door is opened and closed with the door glass 3 in the fully closed position. The outer side wall 13 is attached along a drip molding 5.

As shown in FIG. 3, when the upper end edge of the door glass 3 is elevated to its fully closed position, it pushes the seal wall 12 of the weather strip 1 upwardly at a point close to the corner portion 15 on the inside thereof. The upper end edge of the door glass 3 and the insert 2 are located so as to interfere with each other when the fully closed door glass 3 is drawn outwardly in the direction when the motor vehicle is driven at high speed.

In accordance with the weather strip 1 of the present invention, even when the door glass 3 deviates outwards or inwards due to variations in the mounted position thereof, the outer side wall 13 freely deforms to enable the upper end edge of the door glass 3 to be embraced by the seal wall 12 in good condition.

When the door is opened in the direction B in FIG. 3, the outer side wall 13 can freely deform so that the load for opening the door hardly increases.

Figure 4:
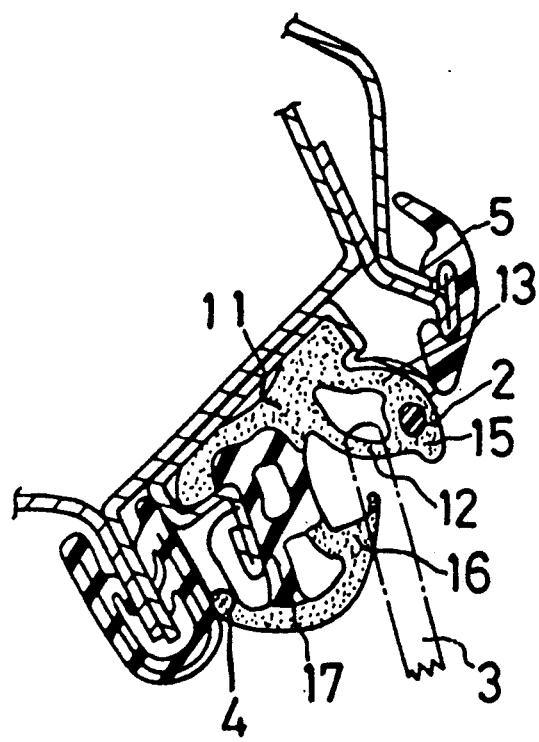
FIG. 4 is a cross-sectional view of another embodiment of the weather strip in accordance with the present invention.
Figure 5:
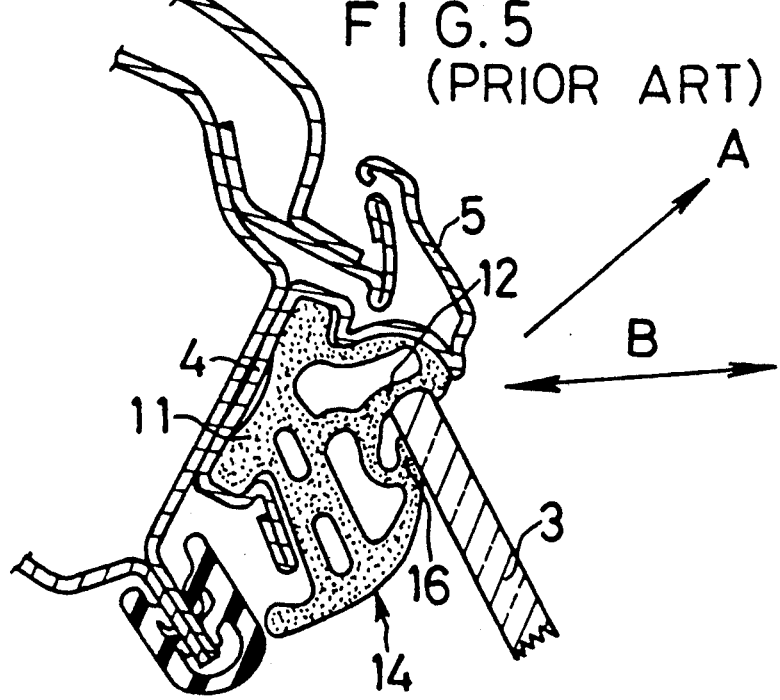
FIGS. 5, 6 and 7 are cross-sectional views of conventional weather strips attached to vehicle bodies.
Figure 6:
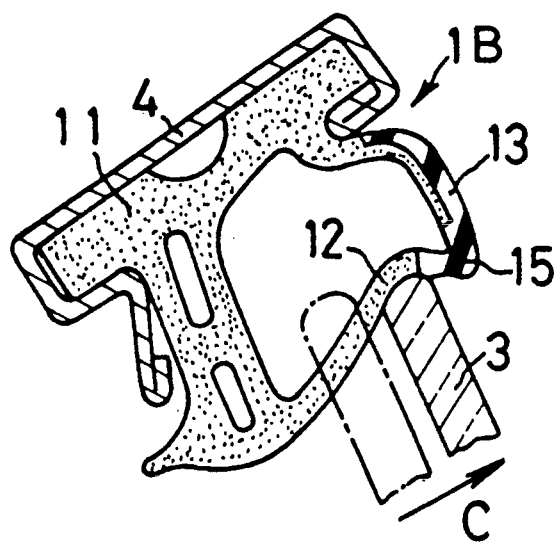
Figure 7:
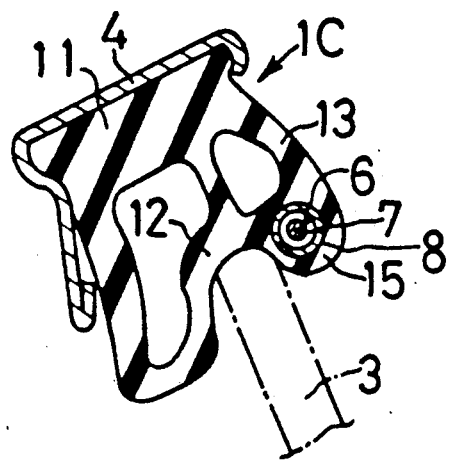

When the door glass 3 is drawn outwardly, the upper end edge thereof moves in the direction of the arrow A in FIG. 4 to push the corner portion 15. This results in the insert 2 being pulled or stretched obliquely upwardly in the direction of the outside of the vehicle body, and tension is generated which acts as a reaction force against the door glass 3. This reaction force increases as the door drawing force increases thereby preventing the door glass from being drawn further outwardly.

As described above, the weather strip of the present invention always exhibits good sealing properties and prevents the door glass from being drawn outwardly.

The weather strip of the present invention is not limited to that of the embodiment shown in FIGS. 2 and 3. Indeed, the present invention is applicable to a weather strip which is further provided with an inner seal lip 16 which is in contact with an inner surface of a door glass 3, as shown in FIG. 4. In this embodiment, an insert 2 is embedded in a corner portion 15 which connects a seal wall 12 to an outer side wall 13.

Moreover, the application of the present invention is not limited to the weather strip composed of a soft elastic material in its entirety. The present invention is applicable to the weather strip having a portion which is composed of a solid material 17, as shown in FIG. 4.

What is claimed is:

1. A weather strip to be attached along a door opening of a body of a motor vehicle and to be pushed by a peripheral edge of a door glass of a sashless door, comprising:

a base portion to be fitted in a retainer which is attached along the door opening;

a tubular sealing portion integral with said base portion, said tubular sealing portion having a seal wall for sealing engaging an upper end edge of the door glass and an outer side wall, and being composed of a soft elastic material; and a linear insert composed of a solid material having a solid, continuous, and uniform cross-section integrally embedded in a corner portion which connects said seal wall and said outer side wall serially in the longitudinal directional of said tubular sealing portion.

2. The weather strip according to claim 1, wherein at least a portion of said base portion and a portion of said tubular sealing portion are integrally extruded.

3. The weather strip according to claim 1, wherein said seal wall is opposed to said base portion and has a thickness so as to be deformable and to hold said upper end edge of the door glass, a thickness of said corner portion being greater than said thickness of said seal wall, said insert being embedded in a central portion of said corner portion.

4. The weather strip according to claim 1, wherein said soft elastic material is sponge rubber.

5. The weather strip according to claim 1, where said solid material is one of solid rubber and a synthetic resin.

* * * * *